United States Patent [19]

Kawabata et al.

[11] Patent Number: 4,916,023

[45] Date of Patent: Apr. 10, 1990

[54] GEL COATING RESIN COMPOSITION AND SHAPED ARTICLE USING THE SAME

[75] Inventors: Yoshichika Kawabata; Shigeru Motomiya; Mitsunori Ikezoe, all of Osaka, Japan

[73] Assignee: Dainippon Ink and Chemicals, Inc., Tokyo, Japan

[21] Appl. No.: 201,701

[22] Filed: Jun. 3, 1988

[30] Foreign Application Priority Data

Jun. 5, 1987 [JP] Japan .................. 62-139930
Jun. 5, 1987 [JP] Japan .................. 62-139931
Jun. 8, 1987 [JP] Japan .................. 62-87536[U]
Jun. 8, 1987 [JP] Japan .................. 62-87537[U]

[51] Int. Cl.$^4$ ............................................. C08L 67/06
[52] U.S. Cl. ........................................ 428/482; 428/413; 428/414; 428/423.7; 525/39; 525/44
[58] Field of Search ............... 428/482, 414, 423.7, 428/413; 525/44, 39

[56] References Cited

FOREIGN PATENT DOCUMENTS 62-007712 1/1987 Japan ........................ 525/44

*Primary Examiner*—Patricia Short

*Attorney, Agent, or Firm*—Armstrong, Nikaido, Marmelstein, Kubovcik & Murray

[57] ABSTRACT

A gel coating resin composition comprises (A) 10 to 45 parts by weight of an unsaturated polyester with an equivalent amount of unsaturated groups ranging from 140 to 330, (B) 15 to 60 parts by weight of a styrene monomer, and (C) 15 to 75 parts by weight of a polyfunctional (meth)acrylic monomer represented by the following general formula (I) and which has an equivalent amount of unsaturated groups ranging from 89 to 130:

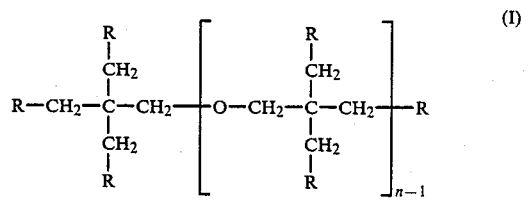

where at least four of the R's present are (meth)acryloxy groups, with the remainder being an organic group except (meth)acryloxy groups; and n is an integer of 1 to 5.

9 Claims, No Drawings

GEL COATING RESIN COMPOSITION AND SHAPED ARTICLE USING THE SAME

BACKGROUND OF THE INVENTION

The present invention relates to a gel coating resin composition having improved surface hardness, as well as high abrasion resistance, good workability, good film forming properties and strong adhesion to adjacent layers. The present invention also relates to a shaped article containing a cured layer of this gel coating resin composition. More particularly, the present invention relates to a shaped synthetic resin article having a surface layer that is gel coated from said resin composition and which is cured with an organic peroxide to produce improved surface hardness, as well as high resistance to abrasion, cigarette burns, and heat.

Gel coating resins are painted on the surface of a mold to produce surface layers on shaped articles. Usually, the surface of the resulting gel coating layer where it contacts air is lined either with a paint composition made of an unsaturated polyester resin and glass fibers so as to produce a shaped FRP (fiber-reinforced plastic) article or with a paint composition made of an unsaturated polyester resin and a filler to make a shaped plastic article such as simulated marble. The so produced shaped articles are primarily used for residential products such as dressing tables in washrooms, kitchen counters and bathtub enclosures. One problem with unsaturated polyester resins that are commonly used as gel coating resins is their low pencil hardness ($\leq 4H$) which makes them highly susceptible to surface damage.

Hard coating agents based on such resins as fluorine, acrylic and silicone resins are commercially available as resins having high surface hardness but all of them are to be cured with UV radiation or electron beams and require post-painting after they are shaped in a desired form. If these resins are used as hard coating resins, expensive apparatuses are necessary for performing irradiation with UV light or electron beams and, at the same time, difficulty is involved in providing uniform radiation energy over the entire surface of shaped articles having many and various forms. A fatal defect with these resins is that prolonged cure time produces nonuniformity between curing on the surface where the coating contact the surface of a mold and curing on the surface of contact with air. In other words, the latter surface which is being irradiated with UV light or electron beams cures faster than the surface of contact with the mold, and this makes it impossible to ensure good adhesion to the subsequently applied lining of a forming resin material unless some preliminary treatment is performed.

Combinations of unsaturated polyesters and acrylic compounds are disclosed in Japanese Patent Application (OPI) Nos. 103994/76, 47039/85, 8318/86 and 69855/86 (the term "OPI" as used herein means an unexamined published Japanese patent application). However, the combination proposed in Japanese Patent Application (OPI) No. 103994/76 is not intended to be used as a gel coating resin, so the unsaturated polyesters considered to be suitable for use have low degrees of unsaturation and acrylic compounds having two unsaturated double bonds in one molecule are listed, with the combination of compounds that have one unsaturated double bond in one molecule being mentioned as a suitable example.

The composition disclosed in Japanese Patent Application (OPI) No. 103994/76 is freed of the odor characteristic of styrene by completely replacing styrene monomers with acrylic compounds. Furthermore, the acrylic compounds used have low viscosity in order to ensure good workability. However, in the absence of styrene monomers, this composition cures poorly and the resulting coating is not sufficiently thin and hard to provide a desired gel-coated surface layer.

The combination of unsaturated polyester and acrylic compound described in Japanese Patent Application (OPI) No. 47039/85 is to be used as a coating composition for shaped polystyrene foams, so it does not permit the use of polymerizable monomers that will dissolve or erode the shaped polystyrene foams. If styrene monomers are used in 15 to 60 parts by weight as in the present invention, the surface of the shaped polyurethane foam will be eroded. So, in order to avoid this problem, the prior patent states that styrene monomers can only be used in amounts of up to 10 parts by weight. Under these circumstances, the acrylic compound that can be used is limited to trimethyloloropane and other low-viscosity acrylic compounds having a functionality of no more than three. However, this does not ensure the production of a gel-coated layer of high hardness as in the present invention.

Japanese Patent Application (OPI) Nos. 69855/86 and 8318/86 disclose a process for producing a resin forming composition that is comprised of a polyfunctional acrylate based resin, a polyester resin and a filler, as well as a process for producing a shaped article having a surface of enhanced hardness, with a gel-coated layer being formed from said composition. However, the polyester resins disclosed in these prior patents are limited to either isophthalic acid containing polyester acrylate based resins or vinyl ester containing unsaturated polyester resins, and the polyfunctional acrylate based resins disclosed are also limited to those special acrylate resins which are curable with UV radiation. In other words, the above-mentioned prior patents do not disclose a gel coating resin composition composed of a specific unsaturated polyester, a specific polyfunctional acrylic monomer and specific copolymerizable ethylenically unsaturated monomer as in the present invention, nor do they disclose a shaped article having a gel coat made from this particular resin composition. As a further problem, compositions using polyester acrylate or vinyl ester based resins usually have dark colors on the surface when they are shaped, so the resulting shaped article will have a rather poor appearance. Furthermore, the poor thixotropy imparting and curing properties of such compositions present problems during shaping operations with respect to spraying characteristics and drying properties, thereby impairing the efficiency of shaping operations.

SUMMARY OF THE INVENTION

The present inventors therefore conducted intensive studies in order to develop a gel coating resin composition that can be painted onto the inner surface of a mold. As a result, the present inventors found that this objective could be attained by a gel coating resin composition comprising (A) 10 to 45 parts by weight of an unsaturated polyester with an equivalent weight per unsaturated group ranging from 140 to 330, (B) 15 to 60 parts by weight of a styrene monomer, and (C) 15 to 75 parts by weight of a polyfunctional (meth)acrylic monomer represented by the following general formula (I) and which has an equivalent weight per unsaturated group ranging from 89 to 130:

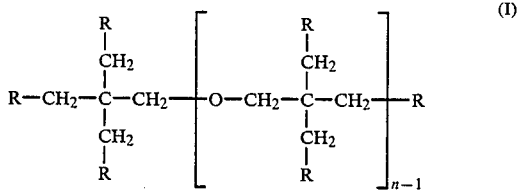

where at least four of the R's present are (meth)acryloxy groups, with the remainder being an organic group except (meth)acryloxy groups, preferably a hydroxyl group or an alkoxyl group having 1 to 3 carbon atoms, namely, methoxy, ethoxy or propoxy; and n is an integer of 1 to 5.

DETAILED DESCRIPTION OF THE INVENTION

The unsaturated polyester used as component (A) in the gel coating resin composition of the present invention may be prepared by any of the known methods. In preparing this unsaturated polyester (A), a dicarboxylic acid or anhydride that does not have an active unsaturated bond such as phthalic anhydride, isophthalic acid, terephthalic acid, tetrahydrophthalic acid, adipic acid or sebacic acid, and a dicarboxylic acid having an active unsaturated bond such as fumaric acid, maleic acid or itaconic acid are used as two acid components, with an alcohol component being a polyhydric alcohol selected from among ethylene glycol, propylene glycol, butylene glycol, 1,5-pentanediol, 1,3-butanediol, 1,6-hexanediol, 2,2-dimethyl-1,3-propanediol, diethylene glycol, triethylene glycol, propylene oxide adducts of bisphenol A, ethylene oxide adducts of bisphenol A, and glycerin.

The unsaturated polyester (A) has an equivalent weight of unsaturated group that ranges from 140 to 330, preferably from 140 to 300. This polyester is used in 10 to 45 parts by weight. It is impossible to synthesize unsaturated polyesters with an equivalent weight per unsaturated group being less than 140. Unsaturated polyesters wherein the equivalent weight per unsaturated group is more than 330 will not to produce high hardness. If the unsaturated polyester (A) is used in less than 10 parts by weight, desired curing and thixotropy imparting properties will not be attained. If the use of the unsaturated polyester (A) exceeds 45 parts by weight, a product with high hardness will not be obtained.

The styrene monomer (B) used in the present invention is important to ensure the ease of painting the gel coating resin composition, which results from low viscosity and high thixotropy imparted, as well as from the viewpoint of the curing properties of the resin composition, or its ability to form an adequately hard coating layer. The styrene monomer (B) is used in 15 to 60 parts by weight, preferably 20 to 60 parts by weight. If this monomer is used in less than 15 parts by weight, desired curing properties will not be attained. If the monomer is used in more than 60 parts by weight, the resulting composition will not have high hardness and its viscosity is too low to justify its use as a gel coating resin. If the styrene monomer (B) is replaced by other kinds of monomer, problems will occur with respect to the efficiency of painting operations and curing properties.

Specific examples of the polyfunctional (meth)acrylic monomer to be used in the present invention that is represented by the general formula (I) and which has an equivalent weight per unsaturated group in the range of from 89 to 130 include: trimethylolmethane tetra(meth)acrylate, pentaerythritol tetra(meth)acrylate, dipentaerythritol tetra(meth)acrylate, dipentaerythritol penta (meth)arylate, and dipentaerythritol hexa(meth)acrylate. Particularly preferred examples are trimethylolmethane tetra(meth)acrylate, pentaerythritol tetraacrylate, dipentaerythritol teteraacrylate, dipentaerythritol pentaacrylate, and dipentaerythritol hexaacrylate. These polyfunctional (meth)acrylic monomers may be used either on their own or as admixtures.

These polyfunctional (meth)acrylic monomers having an equivalent weight per unsaturated group in the range of 89 to 130 are used in 15 to 75 parts by weight, preferably 18 to 65 parts by weight. If they are used in less than 15 parts by weight, resin compositions having high hardness will not be attained. If the monomers are used in more than 75 parts by weight, desired curing properties will not be attained and the efficiency of painting operations will be impaired. Polyfunctional (meth)acrylic monomers whose equivalent weight per unsaturated group is smaller than 89 are impossible to synthesize. If the weight per unsaturated group is greater than 130, the desired high hardness cannot be attained.

The gel coating resin composition of the present invention may optionally contain a metal compound as a cure accelerator. Metal compounds commonly employed as accelerators in unsaturated polyester resins may be used and they include cobalt naphthenate, cobalt 2-ethylhexanoate, divalent acetylacetonatocobalt, trivalent acetylacetonatocobalt, potassium hexanoate, zirconium naphthenate, acetylacetonatozirconium, vanadium naphthenate, vanadium 2 -methylhexanoate, acetylacetonatovanadium, acetylacetonatovanadyl, and acetylacetonatolithium. These compounds may be used either independently or in combination with each other. They may, if desired, be combined with other known accelerators such as amines, phosphorous-containing compounds, and β-diketones.

The amount in which the cure accelerator is added is appropriately adjusted depending upon the desired gel time. Preferably, it is added in 0.0001 to 0.12 parts by weight in terms of the metal component. If the resin composition produced is to be shaped at temperatures at or above 40° C., the use of cure accelerators is optional.

The composition of the present invention may incorporate an organic peroxide as required such as ketone peroxides, hydroperoxides, diacyl peroxides, peroxyketals, alkyl peresters and percarbonates. The choice of organic peroxides depends on the shaping temperature to be employed. Organic peroxides are used in standard amounts and the range of 0.1 to 4 parts is preferred. Needless to say, organic peroxides may be used in combination.

The gel coating resin composition of the present invention may further incorporate, as required, various additives such as organic or inorganic thixotropes, organic or inorganic pigments, stabilizers, defoaming agents, and leveling agents.

Suitable organic and inorganic thixotropes include, for example, silica powders, asbestos powders, hydrogenated caster oil, aliphatic acid amides, and other known thixotropes. These thixotropes may be added in amounts that provide thixotropic values of 2 to 7 as measured by the method described in JIS K 6901-1977. These thixotropes may be used either on their own or as admixtures.

By imparting thixotropy, the efficiency of painting operations, film-forming properties and leveling properties can be improved and the occurrence of defects such as discontinuity in gel-coated paint films can be substantially eliminated. As a further advantage, mechanical painting operations such as spraying can be accomplished without using any solvent.

The gel coating resin composition of the present invention is applied with a suitable method such as spraying or brushing to the surface of a mold in a desired shape, with a known mold release agent being preliminarily coated, to give a thickness that usually ranges from 0.01 to 0.7 mm, and the resulting gel coat is subsequently cured. Coating operations are usually performed at ambient temperature, with the mold being typically held at ambient temperature or in the range of 40° to 150° C. The applied gel coating resin composition may be cured at ambient temperature, typically in the range of 40° to 80° C.

After curing, the gel-coated paint film is lined with a layer of fiber-reinforced plastics based on thermosetting resins or marble, either natural or simulated, or combinations thereof, and the assembly is cured and demolded to form a shaped article having the gel coat as a surface layer.

In the present invention, a thermosetting resin is used as the principal component of the lining to be formed on the surface layer made from the above-described gel coating resin composition. This is a resin composition (2) comprising the following ingredients: one synthetic resin selected from the group consisting of an unsaturated polyester resin, a vinyl ester resin, an epoxy resin, an acrylic resin and a urethane resin and which can be shaped in a desired form under properly selected conditions such as at ambient temperature, under heating, at atmospheric pressure or at superatmospheric pressure; and a fibrous reinforcement and/or an inorganic or organic filler. An unsaturated polyester resin or a vinyl ester resin is particularly preferred as the first component of the composition (2).

A vinyl ester resin suitable for use in the present invention may be prepared by any known method and illustrative vinyl ester resins include: an epoxy acrylate formed from an epoxy resin and acrylic or methacrylic acid, and an unsaturated or saturated polyester acrylate formed by reacting an unsaturated or saturated polyester, which is made from an unsaturated or saturated dicarboxylic acid and a polyhydric alcohol, with an epoxy compound containing an $\alpha,\beta$-unsaturated carboxylic acid ester group. Examples of the saturated dicarboxylic acid that does not have an active unsaturated group include orthophthalic acid, isophthalic acid, terephthalic acid, tetrahydrophthalic acid, adipic acid, and sebacic acid. Examples of the unsaturated dicarboxylic acid having an active unsaturated group include fumaric acid, maleic acid, itaconic acid, etc.

Illustrative polyhydric alcohols include ethylene glycol, propylene glycol, butylene glycol, 1,5-pentanediol, 1,3-butanediol, 1,6-hexanediol, 2,2-dimethyl-1,3-propanediol, diethyleneglycol, triethyleneglycol, propylene oxide adducts of bisphenol A, ethylene oxide adducts of bisphenol A, glycerin, etc.

Typical examples of the epoxy resin include bisphenol A diglycidyl ether, high-molecular weight homologs thereof, and novolak type polyglycidyl ethers.

A typical example of the epoxy compound containing an $\alpha,\beta$-unsaturated carboxylic acid ester group is glycidyl methacrylate.

The unsaturated polyester resins or vinyl ester resins described above are preferably such that the equivalent weight per unsaturated group is in the range of from about 140 to 500. These resins may optionally incorporate colorants (inorganic or organic pigments), stabilizers and other appropriate additives. If desired, cure accelerators and peroxides of the types described above may also be incorporated.

Illustrative fillers that can be used include calcium carbonate, clay, talc, silica, mica, aluminum hydroxide, barium sulfate, milled fibers, marble powder, mica powder, porcelain powder, glass frit, sand, stone, glass microbaloons, woodmeal, etc. These fillers generally are used in amounts that range from 50 to 300 parts by weight per 100 parts by weight of the resin.

Illustrative fibrous reinforcements that can be used include organic synthetic fibers such as polyester fibers, aramide fibers, and Vinylon fibers, inorganic synthetic fibers such as carbon fibers and stainless steel fibers glass fibers, and natural fibers such as asbestos fibers. These fibers may be employed in suitable forms such as roving cloth and chopped strand mat. The fibrous reinforcements generally are used in amounts ranging form 5 to 50 wt % as their net content.

When the resin composition (2) is placed on a cured film of the gel coating resin composition (1) and subsequently cured, the adhesion between the cured film and the resin composition (2) will generally decrease as the hardness of the cured film increases or as it cures completely and this increases the chance of separation between the two layers. However, if the resin composition (1) of the present invention is gel-coated and cured subsequently, the curing process is retarded by aerial oxygen and the side of the gel coat where it contacts air, or the side where it is in contact with the resin composition (2), will cure incompletely, possibly helping to improve the adhesion between the gel coat and the cured layer of resin composition (2). In the case of producing a complexly shaped article according to the present invention, if a cured layer of the resin composition (2) containing a fibrous reinforcement and/or an inorganic or organic filler is formed directly on the cured film of resin composition (1), the high rigidity of the cured layer of resin composition (2) is retained and upon exertion of high impact or cyclic hot-cold shocks on the shaped article, any strain that develops between the gel-coated film and the layer of resin composition (2) will remain unabsorbed, leading to the potential development of cracks in the coated film. In order to absorb residual strain as required, an unsaturated polyester resin that has a pencil hardness of 3H to 4H and an equivalent weight per unsaturated group in the range of 150 to 500 is preferably gel-coated on the surface of the cured film of resin composition (1) and after curing the gel coated resin to form a strain buffering layer, the resin composition (2) containing a fibrous reinforcement and/or an inorganic or organic filler is formed and cured on that buffer layer.

A shaped article may be produced in the present invention by the following procedures: a mold release agent is applied to the outer surface or a male mold or the inner surface of a female mold, each having a desired shape; the applied release agent is dried; a mixture of the gel coating resin composition (1), a curing agent, a cure accelerator and any other necessary components is sprayed or brushed and subsequently cured at a temperature in the range of from ambient temperature to 150° C., preferably between 30° and 90° C.; if desired, the unsaturated polyester resin described in the previous paragraph is coated and cured in a like manner to form a strain buffering layer; a lining layer made of the resin composition (2), a curing agent, a cure accelerator and any other necessary components is then formed at ambient temperature, with heating, at atmospheric pressure or at superatmospheric pressure by the hand layup process, the sprayup process, pressing, injection or casting, and thereafter cured. The thickness of the surface layer made of the gel coating resin composition (1) is not limited to any particular value but is preferably within the range of 0.01 to 0.7 mm. The thickness of the strain buffering layer also is not limited to any particular value but is preferably in the range of 0.01 to 1.5 mm. The thickness of the lining layer is not limited to any particular value if it is sufficient to provide the necessary strength for shaped articles but it generally has a thickness of 0.5 to 100 mm, preferably 2 to 50 mm.

The gel coating resin composition of the present invention may be applied, cured and used under the same conditions with the same equipment through the same steps as in the case of common known (commercially available) gel coating resin compositions. Since it offers the additional advantages of high efficiency of painting operations, good film-forming properties, good adhesion and high surface hardness, this gel coating resin composition can be used as a material for producing a high-quality surface layer on articles shaped from FRP, simulated marble, natural marble, etc.

The gel coating resin composition of the present invention has a higher surface hardness (7H to 9H as measured by a pencil scratch test) than ordinary known gel coating resins (3H to 4H). In addition, it has an increased abrasion resistance and is capable of withstanding a load of 630 to 690 g when abraded with steel wool #0000, i.e., about 13.2 times the value attained by the conventional products. Because of these features, the gel coating resin composition of the present invention will satisfactorily withstand all of the abrasions that are to be encountered by using everyday devices and tools.

The shaped article formed from this resin composition has high surface hardness, as well as high resistance to abrasion, heat, cigarette's fire and soiling and hence adds great value to commercial products such as residential articles including tables, dressing tables in washrooms, kitchen counters, sinks, bathtub enclosures, bath chairs furniture and building materials.

The following examples are provided for the purpose of further illustrating the present invention but are in no way to be taken as limiting. In these examples, all "percents" and "parts" are on a weight basis.

EXAMPLE 1

Propylene glycol, ethylene glycol and maleic anhydride were reacted at a molar ratio of 1.0:2.0:3.0 by standard procedures so as to prepare an unsaturated polyester (1) having an acid value of 27.

The unsaturated polyester (1) had a value of about 147 as the equivalent weight per unsaturated group. Thirty-three parts of this unsaturated polyester (1) were mixed with 42 parts of a styrene monomer, 25 parts of dipentaerythritol hexaacrylate, 0.01 part of hydroquinone, 0.012 parts as the metallic component of 6% cobalt naphthenate, and 2.5 parts of a thixotrope Aerosil #200 (silica powder of Nippon Aerosil Co., Ltd.) to make composition No. 1. The viscosity, thixotropy and gel time of this composition were measured and the results are summarized in Table 1.

To 100 parts of composition No. 1, 2.0 parts of 55% methyl ethyl ketone peroxide (Permek N of Nippon Oils & Fats Co., Ltd.) was added as an organic peroxide. The mixture was subjected to a paint test using a spray gun (bore diameter, 3.0 mm) at a pneumatic pressure of 3.0 kg/cm$^2$ and at room temperature with the mold temperature held at 23° C. The thickness of the paint coating formed was about 0.2 mm. The test results are shown in Table 2.

The resulting gel coat was cured at room temperature and subsequently lined with a glass-fiber reinforced plastic layer formed from an unsaturated polyester resin (Polylite FH-113 of Dainippon Ink & Chemicals, Inc.) and glass fibers by standard procedures. After curing, the resulting shaped product (A) of glass-fiber reinforced plastic having a surface layer made of the gel-coated resin was demolded. The physical properties of the film on the surface of this shaped product were tested and the results are shown in Table 3.

EXAMPLE 2

According to standard procedures, 2,2-dimethyl-1,3-propanediol, propylene glycol and isophthalic acid were reacted at equal molar proportions. When an acid value of 2 was attained, propylene glycol and fumaric acid were added at a molar ratio of 2.0:3.0 to make an unsaturated polyester (2) having an acid value of 6. The equivalent weight per unsaturated group in this polyester (2) was about 234.

Twenty-five parts of the unsaturated polyester (2) were mixed with 35 parts of a styrene monomer, 25 parts of dipentaerythritol hexaacrylate, 15 parts of dipentaerythritol pentaacrylate, 0.01 part of hydroquinone, 0.012 parts as the metallic component of 6% cobalt naphthenate, and 2.5 parts of a thixotrope Aerosil #300 (silica powder of Nippon Aerosil Co., Ltd.) to make composition No. 2.

As in Example 1, the viscosity, thixotropy and gel time of composition No. 2 were measured and the results are summarized in Table 1. The results of a paint test conducted on this composition as in Example 1 are shown in Table 2. Shaped product (B) of glass-fiber reinforced plastic was fabricated as in Example 1 and the physical properties of the film on the surface of this shaped product were evaluated, with the results being shown in Table 3.

EXAMPLE 3

According to standard procedures, 2,2-dimethyl-1,3-propanediol and isophthalic acid were reacted at a molar ratio of 2.0:1.0). When an acid value of 2 was attained, propylene glycol and fumaric acid were added at a molar ratio of 1.0:2.0 to make an unsaturated polyester (3) having an acid value of 6. The equivalent weight per unsaturated group in this polyester (3) was about 287.

Twenty-five parts of the unsaturated polyester (3) were mixed with 35 parts of a styrene monomer, 25 parts of dipentaerythritol hexaacrylate, 15 parts of dipentaerythritol pentaacrylate, 0.01 part of hydroquinone, 0.012 parts as the metallic component of 6% cobalt naphthenate, and 2.5 parts of a thixotrope Aerosil #300 (silica powder of Nippon Aerosil Co., Ltd.) to make composition No. 3.

As in Example 1, the viscosity, thixotropy and gel time of composition No. 3 were measured and the results are summarized in Table 1. The results of a paint test conducted on this composition as in Example 1 are shown in Table 2. Shaped product (C) of glass-fiber reinforced plastic was fabricated as in Example 1 and the physical properties of the film on the surface of this shaped product were evaluated, with the results being shown in Table 3.

EXAMPLE 4

Composition No. 3 prepared in Example 3 was gel-coated on a mold as in Example 1. Using 100 parts of a commercially available unsaturated polyester resin (Polylite TP-123 of Dainippon Ink & chemicals, Inc.) and 200 parts of an inorganic filler (Higilite H-310, the trade name of aluminum hydroxide produced by Showa Keikinzoku K.K.), a simulated marble layer was formed on the gel coat by standard procedures, and subsequently cured and demolded to obtain a shaped article (D) of simulated marble with a pale pink color that had a surface layer made of the gel-coated resin. The physical properties of the film on the surface of this shaped article were evaluated and the results are shown in Table 3. When the shaped article was submerged in boiling water for 10 hours, the color of its surface changed to produce a color difference $\Delta E$ of 3.8 as measured by the method described in JIS Z8722 and 8730.

EXAMPLE 5

To 30 parts of the unsaturated polyester (1) prepared in Example 1, 30 parts of a styrene monomer, 25 parts of dipentaerythritol hexaacrylate, 15 parts of dipentaerythritol pentaacrylate, 0.01 part of hydroquinone and 2.5 parts of a thixotrope Aerosil #200 were added so as to make composition No. 4. The viscosity, thixotropy and gel time of this composition were measured and the results are summarized in Table 1.

To 100 parts of the composition No. 4, 1.0 parts of 95% bis-4-tertiary butyl cyclohexyl peroxydicarbonate (Percadox 16 of Kayaku Nouley Co., Ltd.) was added as an organic peroxide. The mixture was subjected to a paint test using a spray gun (bore diameter, 3.0 mm) at a pneumatic pressure of 3.0 kg/cm$^2$ and at room temperature with the mold temperature held at 70° C. The thickness of the paint coating formed was about 0.1 mm. The test results are shown in Table 2.

The surface layer made of the gel-coated resin was cured in a 70° C. atmosphere and subsequently cooled to room temperature. As in Example 1, a layer of glass-fiber reinforced plastic was formed on the gel coat and cured to make a shaped article (E) of glass-fiber reinforced plastic. The physical properties of the film on the surface of this shaped article were evaluated and the results are shown in Table 3.

EXAMPLE 6

To 25 parts of the unsaturated polyester (3) prepared in Example 3, 35 parts of a styrene monomer, 25 parts of dipentaerythritol hexaacrylate, 15 parts of dipentaerythritol pentaacrylate, 0.01 part of hydroquinone, 0.3 parts of a vanadium-based accelerator (Accelerator VN-2, the trade name of metallic vanadium. produced by Kayaku Nouley Co., Ltd.) and 2.5 parts of a thixotrope (Aerosil #300 of Nippon Aerosil Co., Ltd.) were added to make composition No. 5.

As in Example 1, the viscosity, thixotropy and gel time of composition No. 5 were measured and the results are summarized in Table 1. A paint test was conducted on this composition as in Example 1 and the results are shown in Table 2. The composition was gel-coated on a mold as in Example 1 and a layer of simulated marble was formed on the gel coat as in Example 4, thereby producing a shaped article (F) of white simulated marble. The physical properties of the film on the surface of this shaped article were evaluated and the results are shown in Table 3. When this shaped article was submerged in boiling water for 10 hours, the color of its surface changed to produce a color difference $\Delta E$ of 0.3 as measured by the method described in JIS Z8722 and 8730.

COMPARATIVE EXAMPLE 1

Propylene glycol, ethylene glycol, phthalic anhydride and maleic anhydride were reacted at equal molar proportions by standard procedures so as to make an unsaturated polyester (4) having an acid value of 27. The equivalent weight per unsaturated group in this polyester was 348. To 30 parts of the unsaturated polyester (4), 40 parts of a styrene monomer, 30 parts of dipentaerythritol hexaacrylate, 0.01 part of hydroquinone, 0.012 parts as the metallic component of 6% cobalt naphthenate, and 2.5 parts of a thixotrope Aerosil #200 (silica powder of Nippon Aerosil Co., Ltd.) were added to make composition No. 6. The viscosity, thixotropy and gel time of this composition No. 6 were measured and the results are summarized in Table 1.

To 100 parts of composition No. 6, 2.0 parts of 55% methyl ethyl ketone peroxide (Permek N of Nippon Oils & Fats Co., Ltd.) was added as an organic peroxide. The mixture was subjected to a paint test using a spray gun (bore diameter, 3.0 mm) at a pneumatic pressure of 3.0 kg/cm$^2$ and at room temperature with the mold temperature held at 23° C. The thickness of the paint coating formed was about 0.2 mm. The test results are shown in Table 2.

Shaped article (G) of glass-fiber reinforced plastic was fabricated as in Example 1 and the physical properties of the film on the surface of this shaped article were evaluated. The results are shown in Table 3.

COMPARATIVE EXAMPLE 2

To 25 parts of the unsaturated polyester (I) prepared in Example 1, 50 parts of a polyfunctional acrylate based resin (DPCA-30 of Nippon Kayaku Co., Ltd.), 25 parts of a styrene monomer, 0.01 part of hydroquinone, 0.012 part as the metallic component of 6% cobalt naphthenate, and 2.5 parts of a thixotrope Aerosil #200 were added so as to make composition No. 7.

As in Example 1, the viscosity, thixotropy and gel time of composition No. 7 were measured and the results are summarized in Table 1. A paint test was conducted on this composition as in Example 1 and the results are shown in Table 2. Shaped article (H) of glass-fiber reinforced plastic was fabricated as in Example 1 and the physical properties of the film on the surface of this shaped article were evaluated, with the results being shown in Table 3.

COMPARATIVE EXAMPLE 3

To 55 parts of the unsaturated polyester (1) prepared in Example 1, 45 parts of a styrene monomer, 0.012 parts as the metallic component of 6% cobalt naphthenate, and 2.0 parts of a thixotrope Aerosil #300 were added, so as to make composition No. 8.

As in Example 1, the viscosity, thixotropy and gel time of composition No. 8 were measured and the results are summarized in Table 1. A paint test was conducted on this composition as in Example 1 and the results are shown in Table 2. Shaped product (I) of glass-fiber reinforced plastic was fabricated as in Example 1 and the physical properties of the film on the surface of this shaped article were evaluated, with the results being shown in Table 3.

COMPARATIVE EXAMPLE 4

To 50 parts of the unsaturated polyester (1) prepared in Example 1, 40 parts of dipentaerythritol pentaacrylate and 10 parts of a styrene monomer were added so as to make composition No. 9. As in Example 1, the viscosity, thixotropy and gel time of composition were measured and the results are summarized in Table 1. A paint test was conducted on this composition as in Example 1 and the results are shown in Table 2. Shaped article (J) was fabricated as in Example 1 and the physical properties of the film on the surface of this article were evaluated, with the results being shown in Table 3.

COMPARATIVE EXAMPLE 5

To 50 parts of the unsaturated polyester (1) prepared in Example 1, 50 parts of dipentaerythritol hexaacrylate was added to make composition No. 10.

As in Example 1, the viscosity, thixotropy and gel time of composition No. 10 were measured and the results are summarized in Table 1. A paint test was conducted on this composition as in Example 1 and the results are shown in Table 2. Shaped article (K) was fabricated as in Example 1 and the physical properties of the film on the surface of this article were evaluated, with the results being shown in Table 3.

TABLE 1

| Composition No. | Facility of painting operation | | |
|---|---|---|---|
| | Viscosity (poise) | Thixotropy | Gel time (min) |
| Sample of the Invention | | | |
| 1 | 23.6 | 4.7 | 15 |
| 2 | 24.3 | 4.9 | 20 |
| 3 | 23.4 | 4.8 | 19 |
| 4 | 24.5 | 4.6 | 18 |
| 5 | 23.8 | 4.9 | 26 |
| Comparative Sample | | | |
| 6 | 23.9 | 4.8 | 18 |
| 7 | 24.5 | 4.7 | 23 |
| 8 | 24.2 | 4.8 | 16 |
| 9 | 67.0 | — | 88 |
| 10 | unmeasurable | unmeasurable | unmeasurable |

Note: (1) Viscosity, thixotropy and gel time as parameters for facility of painting operations were measured in accordance with the method of testing liquid unsaturated polyester resins described in JIS K 6901-1977. The temperature for measurements was 25° C. As for the gel time of composition Nos. 1 to 3 and 5 to 8, 2.0 parts of 55% methyl ethyl ketone peroxide (MEKPO) (Permek-N of Nippon Oils & Fats Co., Ltd.) was added. As for the gel time of composition Nos. 4, 9 and 10, 0.012 parts as the metallic component of 6% cobalt naphthenate and 2.0 parts of 55% MEKPO were added.

In Table 1, composition Nos. 1 to 5 were samples of the present invention, and the other compositions were intended as comparative samples. Composition No. 10 was partially solid and defied measurements.

TABLE 2

| Composition No. | Spray output (as index of the facility of painting operation) (g/mm) | Film-forming property cratering |
|---|---|---|
| Sample of the invention | | |
| 1 | 980 | none |
| 2 | 990 | none |
| 3 | 980 | none |
| 4 | 975 | none |
| 5 | 985 | none |
| Comparative sample | | |
| 6 | 980 | none |
| 7 | 990 | none |
| 8 | 985 | none |
| 9 | 13 | unmeasurable |
| 10 | unmeasurable | unmeasurable |

Note: (1) Testing facility of painting operation in terms of spray output: A spray gun was charged with about 1,000 g of a sample under the conditions employed in Example 1 and the overall weight was measured; after spraying for 30 seconds, the resulting weight loss was measured and doubled to determined the spray output for 1 minute.
(2) Testing film-forming property in terms of cratering: A sample composition was coated on the mold surface to give a film thickness of about 0.2 mm and the resulting film was visually checked for the presence of any cratering.

In Table 2, composition Nos. 1 to 5 were samples of the present invention, and the other compositions were intended as comparative samples. Compositions Nos. 9 and 10 defined measurements because they were either highly viscous or partially solid.

TABLE 3

| Shaped article | Abrasion resistance | | Adhesion |
|---|---|---|---|
| | Pencil scratch test (H) | Steel wool abrasion test (g) | |
| Sample of the invention | | | |
| A | 7-8 | 630 | 8 |
| B | 8-9 | 650 | 8 |
| C | 8-9 | 660 | 8 |
| D | 8-9 | 660 | 8 |
| E | >9 | 690 | 8 |
| F | 8-9 | 650 | 8 |
| Comparative sample | | | |
| G | 4-5 | 210 | 8 |
| H | 5-6 | 260 | 8 |
| I | 3-4 | 50 | 8 |
| J | 4 | 80 | 8 |
| K | unmoldable | unmoldable | unmoldable |

Note: (1) Pencil scratch test
Conducted in accordance with the General Procedures for Testing Paints under 6.14 of JIS K 5400-1979.
(2) Steel wool abrasion test
A sample in contact with steel wool #0000 was allowed to make 100 turns and the steel wool load that caused damage to the gel coat was measured.
(3) Adhesion test
A cross cut adhesion test was conducted in accordance with the General Procedures for Testing Paints under 6.1 5 of JIS K-5400-1979.

In Table 3, shaped articles A to F were samples of the present invention, and the other articles were intended as comparative samples. Sample K was partially solid and could not be shaped in a desired form.

EXAMPLE 7

A four-necked flask equipped with a stirrer, a thermometer, and air condenser and a nitrogen introducing pipe was charged with maleic anhydride, ethylene glycol and propylene glycol at a molar ratio of 3/2/1.15. The contents were reacted by standard procedures until an acid value of 27 was attained. Thereafter, 100 ppm of hydroquinone was added as a polymerization inhibitor to obtain an unsaturated polyester (5). The equivalent weight per unsaturated group in this polyester was about 147.

EXAMPLE 8

In accordance with standard procedures, 2,2-dimethyl-1,3-propanediol, propylene glycol and isophthalic acid were reacted at a molar ratio of 1/1/1. When an acid value of 2 was attained, propylene glycol and fumaric acid were reacted at a molar ratio of 2/3 until an acid value of 25 was attained. Thereafter, 100 ppm of hydroquinone was added as a polymerization initiator to obtain an unsaturated polyester (6). The equivalent weight per unsaturated group in this polyester was about 234.

EXAMPLE 9

The inner surface of a FRP mold that would provide a kitchen counter top measuring 60×200 cam was cleaned well and dried. To the dried mold surface, a mold release agent (i.e., a solution of Poval in a mixture of methanol and water) impregnated in a sponge was applied and subsequently dried.

A gel coating resin composition (1) was formulated by intimately blending the following ingredients:

| (A) | Unsaturated polyester (5) | 33 parts |
| --- | --- | --- |
| (C) | Dipentaerythritol hexaacrylate (DPHA) | 25 parts |
| (B) | Styrene monomer (SM) | 42 parts |
| | 6% Cobalt naphthenate | 0.1 part |
| | Aerosil #200 (silica powder of Nippon Aerosil Co., Ltd.) | 2.5 parts |
| | 55% Methyl ethyl ketone peroxide (MEKPO) | 2 parts |

Using a spray gun (bore diameter, 3.0 mm), the composition (1) was applied at room temperature (ca. 25° C.) and at a pneumatic pressure of 3.0 kg/cm² with the mold temperature held at about 25° C. to give a film thickness of about 0.3 mm. The applied film was left for about 2 hours to cure.

In the next step, a resin composition (2) was prepared by intimately blending 100 parts of an unsaturated polyester resin (Polylite TP-123 of Dainippon Ink & Chemicals, Inc.), 100 parts of aluminum hydroxide (Higilite H-310 of Showa Keikinzoku K.K.), 100 parts of aluminum hydroxide (Higilite H-100), 0.1 part of 6% cobalt naphthenate and 1 part of 55% MEKPO. The resulting composition (2) was poured into the mold, allowed to taken on a desired form, and cured at room temperature. About 2 hours later, the cured composition was demolded to obtain a white shaped article in the form of a kitchen counter top 10 mm thick. This article was clear and had a gel-coated surface. The physical properties of the surface of this shaped article were evaluated and the results are shown in Table 4.

EXAMPLE 10

As in Example 9, the inner surface of a FRP mold for providing a kitchen counter was coated with a mold release agent and dried.

A gel coating resin composition (1) was formulated by intimately blending the following ingredients:

| (A) | Unsaturated polyester (5) | 25 parts |
| --- | --- | --- |
| (C) | DPHA | 25 parts |
| (C) | Dipentaerythritol pentaacrylate (DPPA) | 15 parts |
| (B) | SM (styrene monomer) | 35 parts |
| | Aerosil #200 | 2.5 parts |
| | Perkadox 16 (organic peroxide of Kayaku Nouley Co., Ltd.) | 1 part |

Using a spray gun (bore diameter, 3.0 mm), the composition (1) was applied at room temperature (23° C.) with the mold temperature held at 70° C. to give a film thickness of about 0.1 mm. The applied film was cured in a 70° C. atmosphere. After the gel coat cured, a conventional gel coating unsaturated polyester resin (Polylite GC-230 of Dainippon Ink & Chemicals, Inc.) was intimately mixed with an ordinary accelerator and curing agent. The resulting mixture was spray-coated on the gel coat of composition (1) at room temperature to give a film thickness of about 0.3 mm, and the applied coating was cured at room temperature.

In the next step, a resin composition (2) was prepared by intimately blending 100 parts of an unsaturated polyester resin (Polylite TP-123 of Dainippon Ink & Chemicals, Inc.), 150 parts of calcium carbonate (NS-200 of Nitto Funka Kogyo K.K.), 50 parts of coarsely ground crystalline limestone #40, 0.1 part of 6% cobalt naphthenate, and 1 part of 55% MEKPO. The mixture was then poured into the mold having two layers of gel coat, allowed to take on a desired form and cured at room temperature. After demolding, post-cure was effected at 50° C. for 3 hours so as to obtain a white shaped article in the form of a kitchen counter 10 mm thick. The surface of this article was made of two layers of gel coating.

The physical properties of the surface of this article were evaluated and the results are summarized in Table 4.

EXAMPLE 11

The surfaces of a FRP mold for making a bathtub enclosure were cleaned well and dried. To the dried mold surfaces, a mold release agent (i.e., a solution of Poval in a mixture of methanol and water) impregnated in a sponge was applied and subsequently dried.

A gel coating resin composition (1) was formulated by intimately blending the following ingredients:

| (A) | Unsaturated polyester (6) | 30 parts |
| --- | --- | --- |
| (C) | DPHA | 30 parts |
| (C) | DPPA | 10 parts |
| (B) | SM | 30 parts |
| | 6% Cobalt naphthenate | 0.1 part |
| | Aerosil #200 | 2.5 parts |
| | 55% MEKPO | 2 parts |

Using a spray gun (bore diameter, 3.0 mm), the composition (1) was applied to the surface of the male mold at room temperature (ca. 25° C.) and at a pneumatic pressure of 3.0 kg/cm² with the mold temperature held at about 25° C. to give a film thickness of about 0.3 mm. The applied film was left at room temperature to cure.

In the next step, a resin composition (2) was prepared by blending 100 parts of an unsaturated polyester resin (Polylite TP-254 of Dainippon Ink & Chemicals, Inc.), 100 parts of aluminum hydroxide (Higilite H-310), 100 parts of aluminum hydroxide (Higilite H-100), 0.1 part of 6% cobalt naphthenate and 1 part of 55% MEKPO. The female mold part on which a ply of glass fiber mat had been deposited by the hand layup process and subsequently cured was assembled with the male mold part on which the gel coating resin composition (1) had been coated and cured. The resin composition (2) was injected through a port in the center of the bottom of the mold to fill the space between the two mold parts, and subsequently cured at room temperature. About 2 hours later, the cured product was demolded and subjected to post-cure in a drying oven at 50° C. for 3 hours so as to obtain a bathtub enclosure having a gel-coated surface layer with an average thickness of 10 mm. The physical properties of the surface of this shaped article were evaluated and the results are shown in Table 4.

EXAMPLE 12

As in Example 11, a mold release agent was applied to the inner surface of FRP mold for making a bathtub enclosure and dried.

A gel coating resin composition (1) was formulated by blending the following ingredients:

| (A) | Unsaturated polyester (6) | 25 parts |
|---|---|---|
| (C) | DPHA | 25 parts |
| (C) | DPPA | 15 parts |
| (B) | SM | 35 parts |
|  | 6% Cobalt naphthenate | 0.1 part |
|  | Aerosil #200 | 2.5 parts |
|  | 55% MEKPO | 1 part |

Using a spray gun (bore diameter, 3.0 mm), the composition (1) was applied to the surface of the male mold part at room temperature (ca. 25° C.) and at a pneumatic pressure of 3.0 kg/cm² with the mold temperature held at about 25° C. to give a film thickness of about 0.1 mm. The applied film was left at room temperature to cure. After the gel coat cured, a conventional gel coating unsaturated polyester resin (Polylite GC-230) was intimately mixed with an ordinary accelerator and curing agent. The resulting mixture was spray-coated on the gel coat of composition (1) at room temperature to give a film thickness of about 0.7 mm, and the applied coating was cured at room temperature.

In the next step, a resin composition (2) was prepared by blending 100 parts of an unsaturated polyester resin (Polylite TP-254 of Dainippon Ink & Chemicals, Inc.), 150 parts of calcium carbonate (NS-200 of Nitto Funka Kogyo K.K.), 50 parts of coarsely ground crystalline limestone #40, 0.1 part of 6% cobalt naphthenate, and 1 part of 55% MEKPO. The female mold part on which a ply of glass fiber mat had been deposited by the hand layup process and subsequently cured was assembled with the male mold part on which the combination of the gel coating resin composition (1) and conventional gel coating resin had been coated and cured. The resin composition (2) was injected through a port in the center of the bottom of the mold to fill the space between the two mold parts, and subsequently cured at room temperature. About 2 hours later, the cured product was demolded and subjected to post-cure in a drying oven 50° C. for 3 hours so as to obtain a bathtub enclosure having a gel-coated surface layer with an average thickness of about 10 mm. The physical properties of the surface of this shaped article were evaluated and the results are shown in Table 4.

COMPARATIVE EXAMPLE 6

A kitchen counter made of an unsaturated polyester resin and which had an average thickness of about 10 mm was fabricated as in Example 9 except that no gel coat of resin composition (1) was formed.

COMPARATIVE EXAMPLE 7

A kitchen counter was fabricated as in Example 10 except that the gel coat was solely made of the conventional gel coating unsaturated polyester resin without using the resin composition (1).

COMPARATIVE EXAMPLE 8

A bathtub enclosure was fabricated as in Example 12 except that the gel coat was solely made of the conventional gel coating unsaturated polyester resin without using the resin composition (1).

COMPARATIVE EXAMPLE 9

As in Example 11, a mold release agent was applied to the inner surface of a FRP mold for making a bathtub enclosure and dried.

A gel coating resin composition was formulated by blending the following ingredients:

| (A) | Unsaturated polyester (6) | 25 parts |
|---|---|---|
| (C) | Polyfunctional acrylate resin DPCA-30 (Nippon Kayaku Co., Ltd.) | 50 parts |
| (B) | SM | 25 parts |
|  | 6% Cobalt naphthenate | 0.1 part |
|  | Aerosil #200 | 2.5 parts |
|  | 55% MEKPO | 2 parts |

Using a spray gun (bore diameter, 3.0 mm), the resin composition was applied to the surface of the male mold part at room temperature (ca. 25° C.) and at a pneumatic pressure of 3.0 kg/cm² with the mold temperature held at 25° C. to give a film thickness of about 0.3 mm. The applied film was left at room temperature to cure.

The subsequent steps were exactly the same as in Example 11. The resin composition (2) was injected to fill the space between the two mold parts and cured to fabricate a bathtub enclosure having a gel-coated layer with an average thickness of 10 mm. The physical properties of the surface of this shaped article were evaluated and the results are shown in Table 4.

TABLE 4

|  | Examples | | | | Comparative Examples | | | |
|---|---|---|---|---|---|---|---|---|
|  | 9 | 10 | 11 | 12 | 6 | 7 | 8 | 9 |
| Type of shaped article | kitchen counter | kitchen counter | bathtub enclosure | bathtub enclosure | kitchen counter | kitchen counter | bathtub enclosure | bathtub enclosure |
| Abrasion resistance |  |  |  |  |  |  |  |  |
| Pencil scratch test[1] | 7 H–8 H | 6 H–7 H | 7 H–8 H | 6 H–7 H | 3 H–4 H | 4 H | '4 H | 5 H–6 H |
| Steel wool (#0000) test[2] | ◉ | ◯ | ◉ | ◯ | X | X | X | X |
| Adhesion (cross cut adhesion test[3]) | 8 | 8 | 8 | 8 | — | 8 | 8 | 8 |
| Heat resistance[4] |  |  |  |  |  |  |  |  |
| 180° C. | OK | OK | OK | OK | OK | OK | OK | OK |

TABLE 4-continued

|  | Examples | | | | Comparative Examples | | | |
| --- | --- | --- | --- | --- | --- | --- | --- | --- |
|  | 9 | 10 | 11 | 12 | 6 | 7 | 8 | 9 |
| 230° C. | OK | OK | OK | OK | deformed, discolored | deformed, discolored | deformed, discolored | deformed, discolored |
| 280° C. | OK | OK | OK | OK | same as above | same as above | same as above | same as above |
| Heat resistance to cigarette Fire[5] | no change | no change | no change | no change | yellowed | yellowed | yellowed | slightly yellowed |
| Strain resistance[6] | | | | | | | | |
| hairdye ("Bigen 8G") | ○ | ○ | ○ | ○ | x | x | x | Δ |
| blue ink | ○ | ○ | ○ | ○ | Δ | Δ | Δ | Δ |

Notes to Table 4
[1] In accordance with JIS K 5400, 6.14
[2] Steel wool #0000 was manually reciprocated by 15 times (◉, no scratch; ○, no more than 10 scratches; x, unaccountable scratches caused loss in surface gloss)
[3] In accordance with JIS K 5400, 6.13
[4] In accordance with JIS K 6902 (the change in appearance or surface was observed after submersion in hot oil-filled container for 20 minutes)
[5] A lighted cigarette ("Peace") was left on the sample and any change in its appearance or surface was noted.
[6] In accordance with JIS K 6902, 2.6 (○, no change; Δ, slightly discolored; x, turned brown)

While the invention has been described in detail and with reference to specific embodiments thereof, it will be apparent to one skilled in the art that various changes and modifications can be made therein without departing from the spirit and scope thereof.

What is claimed is:

1. A gel coating resin composition comprising (A) 10 to 45 parts by weight of an unsaturated polyester with an equivalent weight per unsaturated group ranging from 140 to 330, (B) 15 to 60 parts by weight of a styrene monomer, and (C) 5 to 75 parts by weight of a polyfunctional (meth)acrylic monomer represented by the following general formula (I) and which has an equivalent weight per unsaturated group ranging from 89 to 130:

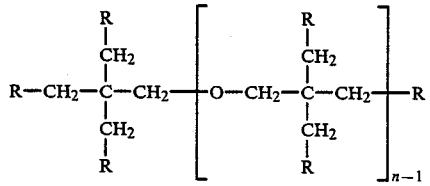

where at least four of the R groups present are (meth)acryloxy groups, with the remainder being an organic group except (meth)acryloxy groups; and n is an integer of 1 to 5.

2. A resin composition according to claim 1 wherein the equivalent weight per unsaturated group in the unsaturated polyester (A) ranges from 140 to 300.

3. In a shaped article chiefly made of a thermosetting resin, the improvement wherein said article has one or two gel-coated surface layers formed of a cured resin composition comprising (A) 10 to 45 parts by weight of an unsaturated polyester with an equivalent weight per unsaturated group ranging from 140 to 330, (B) 15 to 60 parts by weight of a styrene monomer, and (C) 15 to 75 parts by weight of a polyfunctional (meth)acrylic monomer represented by the following general formula (I) and which has an equivalent weight per unsaturated group ranging from 89 to 130:

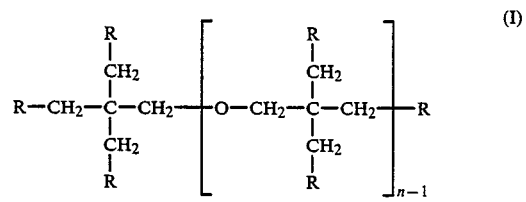

(where at least four of the R groups present are (meth)acryloxy groups, with the remainder being an organic group except (meth)acryloxy groups; and n is an integer of 1 to 5), the second surface layer being optionally made of a gel coating of an unsaturated polyester resin.

4. A shaped article according to claim 3 wherein said thermosetting resin is a resin composition comprising one synthetic resin that can be shaped into a desired form by a known shaping process and which is selected from among an unsaturated polyester resin, a vinyl ester resin, an epoxy resin, and acrylic resin and a urethane resin, a fibrous reinforcement, and/or an inorganic or organic filler.

5. A shape article according to claim 3, wherein the article is washroom equipment.

6. A shape article according to claim 3, wherein the article is a kitchen counter.

7. A shaped article according to claim 3, wherein the article is a sink.

8. A shaped article according to claim 3, wherein the article is a bathtub enclosure.

9. A shaped article according to claim 3, wherein the article is a building component.

* * * * *